United States Patent Office 3,396,263
Patented Aug. 6, 1968

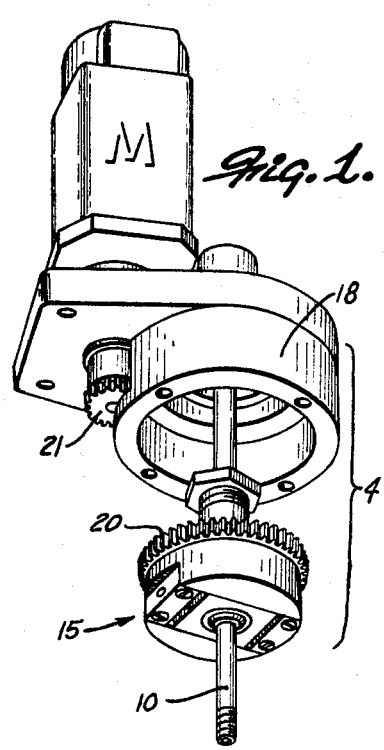
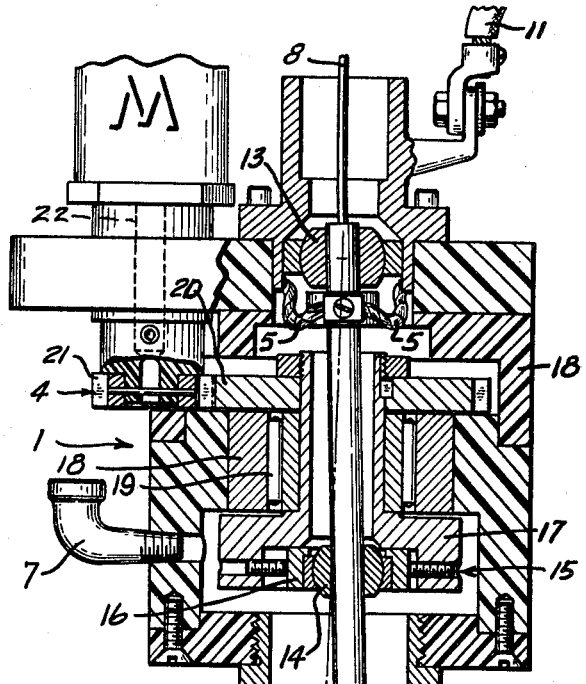
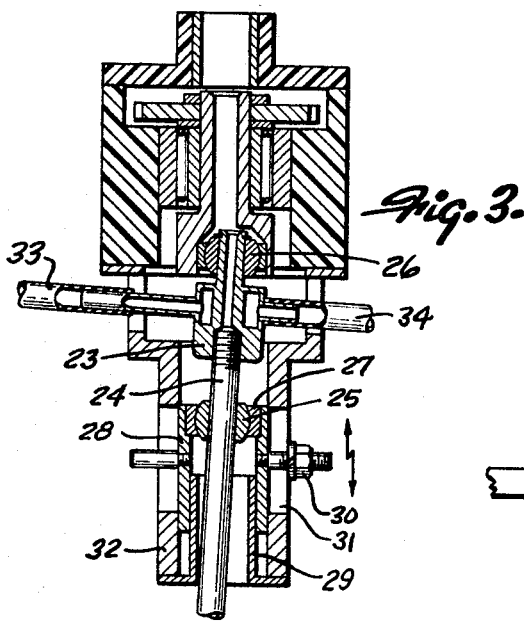
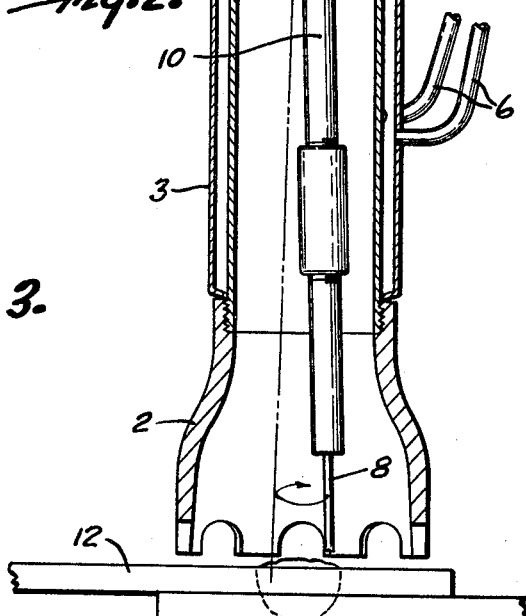
INVENTORS.
T. M. EVEN
M. E. BERG
BY James E. Nilles
ATTORNEY

3,396,263
OSCILLATING ARC WELDING GUN
Thomas M. Even, Milwaukee, and Milford E. Berg, Brookfield, Wis., assignors to Harnischfeger Corporation, West Milwaukee, Wis., a corporation of Wisconsin
Filed Dec. 16, 1965, Ser. No. 514,419
7 Claims. (Cl. 219—127)

ABSTRACT OF THE DISCLOSURE

An arc welding nozzle, for burn through spot welding, having a non-oscillating main body and a minimal weight contact tube pivotally connected therein for circular swinging motion. The contact tube has a central passage therethrough for guiding a consumable electrode therethrough. A variable speed drive mechanism is connected to the contact tube by an adjustable device for varying the amplitude of oscillation.

---

Various devices have been proposed in the past to provide oscillation to a welding electrode but have certain shortcomings. For example, some of these devices oscillated the complete welding head, which creates a serious equipment life problem due to the substantial mass being subjected to a vibratory motion. In addition, oscillation of a large mass seriously limits the range of oscillation rate which might be obtained. Other prior art devices utilized relatively long shafts which were reciprocated by a cam, and thus were limited in the patterns of motion which may be obtained. The non-axial apparatus of this type also is bulky and consequently has not been widely accepted.

The present invention is directed to an oscillatory nozzle in which only the contact guide tube is oscillated and requires no remote pivoted shaft, because the contact guide tube itself is pivoted and driven in a rotary path over the workpiece. A more specific aspect of the invention provides for adjustment over a wide range of oscillation diameters and rates of movement. The resulting equipment has proved to be rugged and, because of its small oscillatory mass, has required little maintenance or repair.

Other advantages of the present oscillating arc gun are increased fusion area above what would otherwise be possible on a given stock thickness, improved control of weld penetration with less burn throughs and consequent weld dropouts, and substantially improved tensile strength, due to the increased fusion area.

The drawings illustrate the presently preferred method of carrying out the invention.

FIGURE 1 is a perspective view showing the drive system for oscillating the contact tube according to one embodiment of the invention;

FIGURE 2 is a longitudinal sectional view of one embodiment of the invention illustrating the drive system in detail; and FIGURE 3 is a diagrammatic longitudinal sectional view of an alternate embodiment of the oscillating mechanism.

As shown in the drawings, the welding nozzle 1 includes a gas cup 2, a barrel 3, an oscillating mechanism assembly 4, and electrode contact cables 5. Water conduits 6 for cooling the barrel 3 connect directly to the barrel 3, as shown in FIGURE 2. Gas tube 7 supplies shielding gas into barrel 3 and to the vicinity surrounding electrode 8 during welding.

FIGURE 2 shows the oscillating mechanism assembly 4 in detail. Contact tube 10 extends axially in barrel 3 and has an inner end connected to the flexible electrode contact cables 5 which are electrically connected to an electrode cable 11 to energize electrode 8 through contact tube 10. The continuous, consumable electrode 8 extends down through contact tube 10 and out of the end of gas cup 2 to establish an arc (not shown) with a workpiece 12 when welding current is supplied to the electrode 8.

The contact tube 10 is supported in barrel 3 by means of a fixed, pivotal spherical bearing 13, and a laterally adjustable, pivotal spherical bearing 14 disposed a predetermined distance from fixed bearing 13. Motive force to oscillate the contact tube 10 is supplied through spherical bearing 14 by a drive means such as drive 15 shown in FIGURE 1.

Drive 15 includes a spherical bearing sleeve 16 in which bearing 14 is disposed. Bearing sleeve 16 is secured to a larger rotating sleeve 17, which is supported at its outer end in a housing 18 of the oscillating mechanism assembly 4 by means of a needle bearing 19. The inner end of sleeve 17 is secured to a rotatable spur gear 20. Gear 20 receives drive from a smaller spur gear 21 which is secured to and driven by a shaft 22, shown by dotted lines in FIGURE 2. Shaft 22 is connected to a variable speed drive means M capable of driving the shaft at speeds in the range of 500–4000 r.p.m.'s.

The amount of eccentricity provided to contact tube 10 by the drive mechanism 4 is determined by the positioning the spherical bearing 14. When the lateral offset of the adjustable spherical bearing 14 from the longitudinal axis of the fixed spherical bearing 13 is increased, then the diameter of the oscillatory path described by the electrode 8 is increased.

As to the rate of swinging of the electrode, depending on particular welding conditions, any oscillation rate from 500–4000 r.p.m. can be matched to any oscillation diameter from .050"–0.50".

In the second embodiment shown on FIGURE 3, a shorter oscillating mechanism 23 is provided on the inner end of a contact tube 24, and includes a longitudinally adjustable, transversely fixed spherical bearing 25 through which the oscillatable contact tube 24 extends. Contact tube 24 is supported at its inner end by an axially disposed fixed spherical bearing 26.

The bearing 25 is disposed in a spherical bearing sleeve 27, which includes an outer housing 28 longitudinally slideable on an inner stationary sleeve 29. A set screw 30, extending through a longitudinal slot 31 in barrel 32, holds the bearing 25 at a fixed longitudinal distance from the bearing 26 to determine the net eccentricity offset angle between the bearings 25 and 26 and thereby establish the diameter of the oscillatory path of contact tube 24 and electrode extending therethrough.

Movement of oscillating mechanism 23 is obtained from any suitable source, such as an air motor, not shown. Flexible conduits 33 and 34 are shown connected to oscillating mechanism 23 for this purpose.

GENERAL

Both of the above described embodiments provide a wide range of oscillatory rates and diameters of oscillatory paths. The second embodiment has the advantage of requiring only a minimum length increase in the welding nozzle for obtaining the required oscillation path diameters. The first embodiment, although requiring more length, does not require as much nozzle width.

The invention provides a simple and compact oscillating burn through spot welding nozzle for either manual or automatic use. The oscillatory path and rate can be easily adjusted within a desired range to meet specific welding requirements.

Various modes of carrying out the invention are contemplated as being within the scope of the following claims particularly pointing out and distinctly claiming the subject matter which is regarded as the invention:

1. Welding nozzle mechanism for oscillating arc spot welding comprising, a contact tube adapted to have a consumable electrode pass therethrough, said contact tube having an inner end and an outer end and disposed within a nozzle, transversely stationary pivot means around a portion of said tube for holding said portion transversely stationary but permitting circular swinging of the outer end of said contact tube within said nozzle, and second means for swinging said tube about said pivot means for swinging in a generally circular path within said nozzle to cause said consequent circular swinging of said outer end.

2. Mechanism as defined in claim 1 including means for adjusting the amplitude of said swinging of said tube.

3. The mechanism as set forth in claim 1 further characterized in that said pivot means comprises a first spherical bearing, and said second means includes a second spherical bearing engaging said contact tube at a distance spaced from said first spherical bearing.

4. Mechanism as described in claim 3 including adjustable means for adjusting the amplitude of circular path movement of said one of said bearings.

5. The mechanism of claim 1, including means associated with said second means for varying the rate of oscillations of said contact tube.

6. The mechanism of claim 3, including means associated with said second means for varying the rate of oscillations of said contact tube.

7. An arc welding nozzle for consumable electrode, burn through spot welding, said nozzle including a non-oscillating main body portion, and a minimal weight contact tube portion having an outer end and also having a central passage therein for guiding said electrode to a workpiece, said contact tube being pivotally connected at one portion to said main body to maintain said one portion transversely stationary and permit circular swinging of said outer end of said contact tube about a circular path within said welding nozzle to provide an oscillating guide means of low mass and minimal inertia for said consumable electrode fed therethrough.

References Cited

UNITED STATES PATENTS

| | | | |
|---|---|---|---|
| 2,773,968 | 12/1956 | Martellotti et al. | 219—69 |
| 3,102,948 | 9/1963 | McCampbell et al. | 219—137 |

FOREIGN PATENTS

| | | |
|---|---|---|
| 879,658 | 10/1961 | Great Britain. |

RICHARD M. WOOD, *Primary Examiner.*

R. F. STAUBLY, *Assistant Examiner.*